Cushing & Glover,
Nut Lock.
No. 109,809. Patented Dec. 6, 1870.
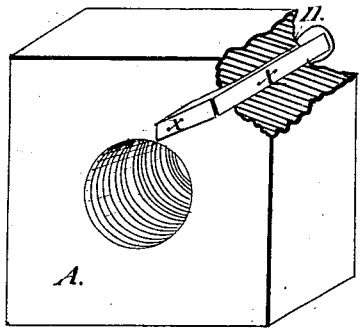
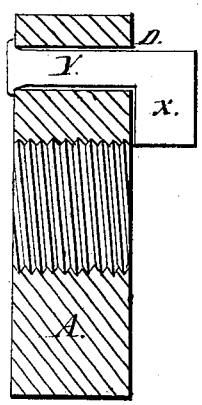
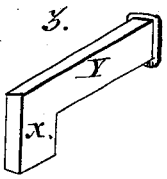
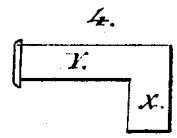
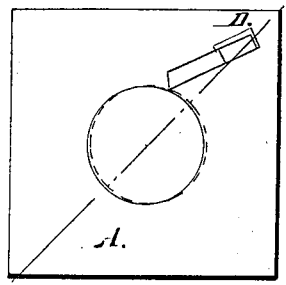
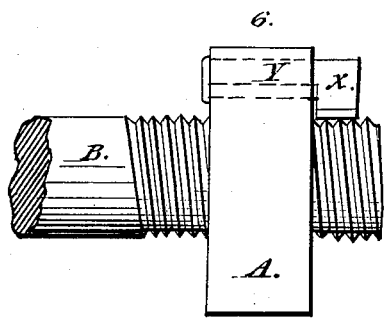
Witnesses:
Edward C. Lewis
Chas. H. Lawrence
Inventor:
M. A. Cushing
O. R. Glover

United States Patent Office.

MILO A. CUSHING AND OTIS R. GLOVER, OF OTTAWA, ILLINOIS.

Letters Patent No. 109,809, dated December 6, 1870; antedated November 26, 1870.

IMPROVEMENT IN NUT-LOCKS.

The Schedule referred to in these Letters Patent and making part of the same.

We, MILO A. CUSHING and OTIS R. GLOVER, of Ottawa, in the county of La Salle, in the State of Illinois, have invented an "Improved Nut-Lock," of which the following is a specification.

Nature and Objects of the Invention.

Our invention relates to the combination of a dog and spring rivet, formed of a single piece of steel, and so applied to the nut of any screw-bolt as to prevent it from becoming loose by jarring or any other cause.

Description of Accompanying Drawing.

Figure 1, isometric view of nut, showing nut-lock in place.
Figure 2, section on line E F.
Figure 3, isometric view of nut-lock.
Figure 4, elevation of nut-lock.
Figure 5, front view.
Figure 6, side view.

General Description.

A is the nut to be locked.
B is the screw-bolt.
X Y is the combined dog and spring rivet, which we will call the nut-lock, and the leg Y the spring rivet, the leg X being the dog.
D is the slot in which the lock is set and attached to the nut.
The nut-lock X Y is formed of a single piece of steel, substantially the shape of the letter L. It has rectangular sides, and its thickness is about two-thirds of its width. One leg of the L forms the spring rivet Y, and the other the dog X of the lock, operating substantially as hereafter described.

The nut A is perforated near one corner by an oblong rectangular slot, D, which is a little larger than the leg of the spring rivet, and points slightly away from the center of the nut.

The leg Y of the L is inserted in the slot D so as to pass entirely through the nut A, and the protruding end riveted or swedged upon the back of the nut, so that the posterior part of the slot D is entirely filled by the end of the rivet, while the shank of the rivet is left free to twist upon itself in the slot D, so as to form a spring rivet, which will hold the dog X in contact with the thread of the screw-bolt B when inserted into the nut A, and, at the same time, allow the nut to be tightened at pleasure.

Whenever, by jarring or other causes, the nut receives a backward impulse, the spring rivet will throw the point of the dog X toward the center of the screw-bolt and make it bite the thread at any point, and prevent the nut from turning backward.

Claim.

We claim as our invention, and desire to secure by Letters Patent the following:

The spring dog X Y, formed of a single piece of steel, and constructed, applied, and operating substantially as described.

MILO A. CUSHING.
OTIS R. GLOVER.

Witnesses:
E. C. LEWIS,
CHAS. H. LAWRENCE.